(12) United States Patent
Gamliel et al.

(10) Patent No.: US 11,347,616 B2
(45) Date of Patent: May 31, 2022

(54) COST ANOMALY DETECTION IN CLOUD DATA PROTECTION

(71) Applicant: EMC IP Holding Company LLC, Hopkinton, MA (US)

(72) Inventors: Roi Gamliel, Moshav Tkuma (IL); Amihai Savir, Sansana (IL); Avitan Gefen, Tel Aviv (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 28 days.

(21) Appl. No.: 16/457,316

(22) Filed: Jun. 28, 2019

(65) Prior Publication Data

US 2020/0409815 A1 Dec. 31, 2020

(51) Int. Cl.
*G06F 11/34* (2006.01)
*G06F 17/18* (2006.01)
*G06F 11/32* (2006.01)
*G06Q 40/00* (2012.01)
*G06F 11/30* (2006.01)

(52) U.S. Cl.
CPC ...... *G06F 11/3447* (2013.01); *G06F 11/3034* (2013.01); *G06F 11/327* (2013.01); *G06F 17/18* (2013.01); *G06Q 40/125* (2013.12)

(58) Field of Classification Search
CPC .................................................. G06F 11/3447
See application file for complete search history.

(56) References Cited

U.S. PATENT DOCUMENTS

| | | | |
|---|---|---|---|
| 9,378,082 B1* | 6/2016 | Nair | G06F 11/0748 |
| 2017/0249648 A1* | 8/2017 | Garvey | G06F 21/55 |
| 2018/0046926 A1* | 2/2018 | Achin | G06Q 10/04 |
| 2018/0330253 A1* | 11/2018 | Gottschlich | G06N 20/00 |
| 2020/0364607 A1* | 11/2020 | BahenaTapia | G06N 7/005 |
| 2021/0124492 A1* | 4/2021 | Savir | G06F 11/2097 |
| 2021/0240539 A1* | 8/2021 | Murthy | G06F 11/301 |

* cited by examiner

*Primary Examiner* — Sm A Rahman
(74) *Attorney, Agent, or Firm* — Workman Nydegger (57) ABSTRACT

Systems and methods for detecting cost anomalies in a data protection system. Data is collected for assets of a data protection system operating in a cloud. The data often relates to cost and may constitute time series. The time series are then analyzed by performing a fitting competition using multiple models. The best fitting model is selected and the residuals are analyzes to find outliers and produce a normal zone for the signal. The outliers can identify cost anomalies that may reflect the health of the data protection system.

16 Claims, 5 Drawing Sheets

COST ANOMALY DETECTION IN CLOUD DATA PROTECTION

FIELD OF THE INVENTION

Embodiments of the invention relate to systems and methods for performing computing operations including data protection operations. More specifically, embodiments of the invention relate to systems and methods for detecting cost anomalies and other data protection operations in systems including cloud-based disaster recovery.

BACKGROUND

Disaster Recovery (DR) should be a fundamental part of a data protection plan. The inability to recover from a disaster can be catastrophic to a business and/or to the customers of the business. While the ability to recover an on-premise environment to a cloud environment is available, performing disaster recovery to the cloud has brought new complexities to the disaster recovery process. For example, entities that rely on cloud-based data recovery systems are often acutely aware of the cost. However, the ability to understand and manage cloud spend has proved difficult in light of the complexity associated with cloud-based disaster recovery systems.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data protection and to systems, methods, and apparatus for performing data protection operations. Examples of data protection operations include, but are not limited to, backup operations, restore operations, replication operations, disaster recovery operations, disaster recovery testing operations, failover or partial failover operations, data synchronization operations, replication operations, cost anomaly detection operations, or the like or combination thereof. More particularly, embodiments of the invention relate to systems, hardware, software, computer-readable media, and methods for performing data protection operations including cost anomaly detection operations for cloud-based disaster recovery.

Disaster recovery is often performed in the context of numerous assets including, for example, virtual machines, data stores, or the like. The cost of a cloud-based disaster recovery system can be incurred in multiple ways. Cloud spend may include, by way of example and not limitation, compute time, storage use (e.g., amount of storage consumed), virtual machine or processor count, or the like. Understanding the cost of the disaster recovery environment is important to the operation of a business. The model of cloud vendors and the nature of pay-as-you-go is a motivation for organizations to take more control and supervision of their cloud spend.

More specifically, most cloud users recognize that cloud spend is complex. Cost awareness can be a substantial factor in an efficient disaster recovery plan and understanding unusual behavior or unusual cost in the disaster recovery environment can be crucial for the operation of the business. In fact, the ability to detect anomalous costs can reflect the health of the disaster recovery system.

Embodiments of the invention are able to identify anomalies in the cost of a cloud-based disaster recovery plan and correlate these anomalies to real concerns. Embodiments of the invention monitor, control, and/or detect anomalies in the cost associated with a cloud environment running disaster recovery solutions. Cost anomalies may point to real issues in the disaster recovery plane. However, even though the identification of cost anomalies can identify real issues in the disaster recovery plane, identifying these behaviors is not a trivial task, especially when there are numerous assets which interconnect with one another.

A disaster recovery system (which may include hardware, software, or the like) both on-premise and/or in the cloud such as DellEMC's Cloud Disaster Recovery, may enable disaster recovery from an on-premises environment to a cloud environment. These systems allows assets that belong to a disaster recovery system to be filtered and identified. In one example, each asset that belongs to a disaster recovery system or solution is tagged with a unique identifier. This unique identifier allows granular inspection and identification of resources (also referred to herein as assets) used by the disaster recovery system and/or the cost associated with the resources. For example, the cost associated with each virtual machine in the cloud can be tracked. The cost of a group of virtual machines in the cloud can be tracked.

Embodiments of the invention automatically discover anomalies or changes in the consumption pattern of cloud resources created by the disaster recovery solution by analyzing historical time series. The analysis can involve past data and edge data (the most recent data). By evaluating the time series of data, the cloud cost can be more effectively managed and controlled, if not reduced.

In one example, the data associated with consumption of cloud resources is analyzed using multiple state-of-the-art time series models with customizable business constraints and patterns, to ensure high accuracy and low false-positive alerts. While the anomaly detection method may be unsupervised, the user can analyze and review outliers identified by the cost detection engine to determine whether the outlier is real or not. In addition, allowing these models to compete can allow the normal expected behavior to be deduced and can facilitate the determination of which model or models are best suited for the available data. Subsequently, the difference between the expected behavior and the actual signal (the residuals) exposes the anomalies. Embodiments of the invention allow new business patterns to be investigated. For example, a user may believe that certain outliers follow a pattern and can identify these outliers as normal. The system can then adapt and treat these data points or outliers (often associated with a pattern) as normal going forward.

In one example, the discovery mechanism of the cost anomaly detection process can be visualized (e.g., in a user interface). The severity of an outlier may be visually expressed in the user interface by enveloping a normal zone where the signal is not considered to be an anomaly. When the signal/data points is/are outside of this area or the normal zone, the signal is considered to be an outlier.

Finding outliers/anomalies in a time-series may be implemented as an unsupervised task. However, there are usually no tagged outliers and there is no good way to measure the accuracy of any particular outlier discovery algorithm. Further, the outputs generated by these algorithms is often subjective in nature. Different people will give different answers and different algorithms may identify different normal behavior and/or different outliers. The outputs of these algorithms may also depend on the topology/scale. For example, the length of the time series may change the classification of an outlier.

In addition, classifying data points as outliers or not in the past is not the same as trying to classify data points on the edge of the time series (e.g., the most recent data points). Further, an obvious outlier may be regarded as a non-outlier if this behavior is anticipated (e.g., an ad-hoc large backup that affects normal system behavior). The increase in cloud storage requirements, for example, results in an expected cost increase. Finally, the business environment introduces behaviors that could follow patterns that are not easy to model (like performing a monthly backup on the first Saturday of the month that follows at least one workday).

Time series patterns that correspond to business behaviors and processes are denoted as business patterns. Embodiments of the invention discover these common patterns and leverage these patterns to make an anomaly detection mechanism accurate by recognizing better what is normal and what is not. In addition, the time series patterns may be evaluated in the context of some predefined patterns. The business pattern that is found to be the best may be selected when identifying outliers. For example, a weekly backup is typically performed on the same day each week. This may result in a change in data transfer/storage costs. When the data fits this pattern, the change in costs are likely to be considered as normal.

Although an enterprise that works with state-of-the-art time series tools could find the right tool with the right parameters for the job when asked for, after trying a few of them, it would be too slow. This will be too slow at least because the enterprise will need to analyze and investigate which business pattern influences the signal and incorporate that business pattern in the model.

Business patterns can be as simple as workday/weekend, holiday, or more complex such as first/ . . . /last weekend (or Friday/Saturday) of the month/quarter/year. Night hours in the weekend (for hourly data) or weekday and so on. There are many open source tools and packages that find anomalies in a time series. Examples of these tools, which are incorporated by reference, may include:

https://github.com/twitter/AnomalyDetection (open source tool), and https://cran.r-project.org/web/packages/tsoutliers/tsoutliers.pdf (open R package)

However, the first resource requires the user to state the percentage of anomalies beforehand while the second resource is a complicated package with many options that require manual labor. Both of these methods cannot or do not have the native capability to incorporate business environment behavior patterns without manual labor.

Some commercial monitoring tools offer some form of anomaly detection like VCOPS, Log Insight Splunk and some more machine learning based analysis tools like Moogsoft, Netuitive, Anodot and Logz. Each of these monitoring toolsoffers its own unique take on time serial anomaly detection and validate that there is great need in the market for such capabilities. However, none of these tools focus on business pattern detection as a way to reduce errors or to automate the fitting of the anomaly detection model as discussed herein.

Figure 1:
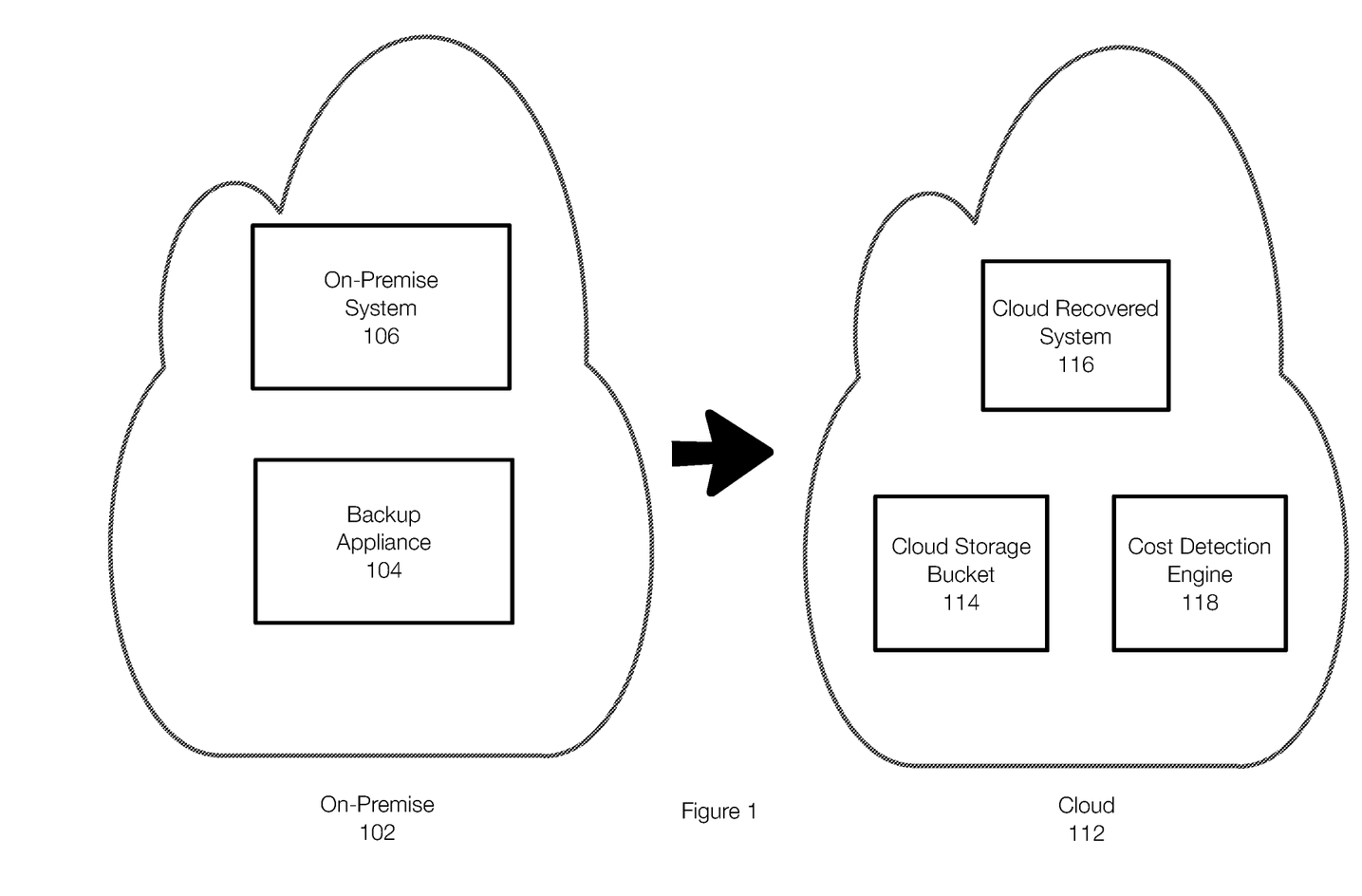
FIG. 1 illustrates an example of a cloud-based disaster recovery system configured to identify cost anomalies.

FIG. 1 illustrates an example of an environment in which data protection operations such as cost anomaly detection may be implemented. FIG. 1 illustrates an on-premise site 102 and a cloud 112 (a cloud-based disaster recovery system implemented in the cloud). The on-premise site 102 may include an on-premise system 106. The system 106 may include production data, virtual machines, servers, storage, or the like. The on-premise site 102 may also include a backup appliance 104, which may be physically and/or virtually implemented. The backup appliance 104 may be configured to perform data protection operations including backup/restore operations. The backup appliance 104 may also be involved in disaster recovery to the cloud 112.

Disaster recovery to the cloud 112 allows an enterprise to copy/replicate backed up virtual machines from the on-premise site 102 to the cloud 112. Once the on-premise system 106 is replicated or copied to the cloud, this allows the cloud recovered system 116 to be run and tested. In some examples, selected portions of the cloud recovered system 116 can be tested. Because the cloud recovered system 116 may be continually changing (e.g., changes in virtual machine counts such as additions or deletions, changes in the data, updates, or the like), disaster recovery, failover, and failback of cloud workloads can be tested in the cloud 112. In fact, tests are often repeated due to the changing nature of the on-premise system 106.

In one example, the data may be replicated to the cloud storage bucket 114 and other resources or assets such as virtual machines may be replicated to the bucket 114 as well. Each resource or asset, as previously stated, may have a unique identifier such that cost can be tracked granularly. The cloud recovered system 116 can then be started or spun up from the bucket 114. Other mechanisms may also be used to prepare the cloud recovered system 116.

The cloud storage bucket 114 is associated with storage costs that also change. Data may be added/deleted in an ongoing manner. New backups, for example, may be added while old backups may be deleted. The data may be deduplicated as well.

In one example, the on-premise system 106 (virtual machines, data, etc.) can be copied or replicated to a cloud storage bucket 114 and the cloud recovered system 116 can then be implemented in the cloud. If the on-premise system 106 fails, the cloud recovered system 116 may serve as the production systems.

A cost detection engine 118 may be included or associated with the cloud recovered system 116 and the cost detection engine 118 is configured to perform cost anomaly detection. The cost detection engine 118 is configured to track the cost associated with the various assets of the cloud recovered system 116. The cost may be tracked when the cloud recovered system 116 is not running, when the system 116 is running, during testing, during setup operations, during failover operations, when used as production, or the like. More specifically, the cost detection engine 118 can track any cost associated with operating, testing, and/or maintaining the disaster recovery system (which may include the system 116, the bucket 114 and the engine 118).

The cost may be tracked in discrete amounts and may be interpreted as a plot or graph. The cost may be represented in terms of time. For instance, one axis may be associated with time increments and the other axis may reflect the cost associated with that time increment. This information can be collected by the cost detection engine 118 from a resource or asset perspective, a system perspective, or portion thereof. Over time, the data collected by the cost detection engine 118 represents a time series of data. Data is continually generated, collected, and included in the time series. As discussed below, this allows data to be analyzed in different manners. For example, the collected data can be analyzed in terms of different frequencies or time periods (e.g., hourly, daily, weekly, monthly, quarterly, yearly, or the like).

Figure 2:
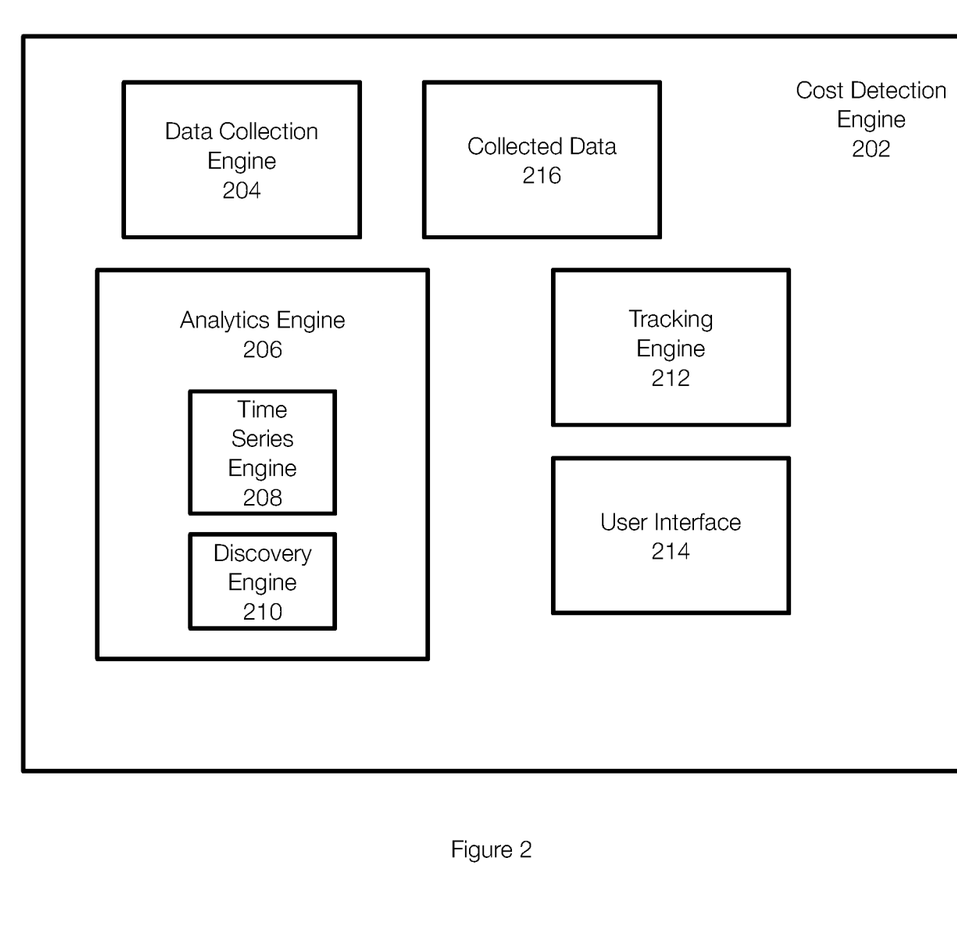
FIG. 2 illustrates an example of a cost detection engine configured to identify cost anomalies in a disaster recovery system or other cloud-based system.

FIG. 2 illustrates an example of a cost detection engine 202, which is an example of the cost detection engine 118. The cost detection engine 202 may include a data collection engine 204. The data collection engine 204 may perform real time or near real time data collection from the resources or assets. For example, the cost of or associated with each virtual machine may be collected, the cost of the storage may be collected, the compute cost may be collected. This information can be summed together for an overall system cost. Thus, embodiments of the invention can perform cost anomaly detection for the system, for specific assets or for groups of assets. The collected data is stored as collected data 216. In one example, the collected data 216 is a time series of data or a plurality of time series data. Each asset, for example, may be associated with a time series.

More specifically, embodiments of the invention allow resources that belong to a disaster recovery solution to be filtered and identified. As previously stated, every resource created in the cloud by the disaster recovery solution may be tagged with a unique identifier. This allows identification and granular inspection of the resources used by the disaster recovery system and/or of their cost. As a result, the data collection engine 204 can collect data about each resource independently of other resources. In one example, this allows the processing cost associated with a specific virtual machine to be tracked over time, allows the memory or storage consumed by a resource to be tracked. Data can be collected for each resource individually, for groups of resources, for the system as a whole, or the like. This allows, as previously stated, identification and granular inspection of the cost associated with each resource in the disaster recovery system.

An analytics engine 206 may include a time series engine 208. The time series engine 208 may include a plurality of different models or methods. Each of these models may be configured to analyze the collected data 216. Because a single model is not able to handle all kinds of time series, the cost detection engine 202 may be allow multiple models to compete with each other in order to improve the overall results. In this example, the time series engine 208 may evaluate the collected data 216 with multiple models and perform a fitting competition. By performing a fitting competition, the model that best fits the collected data can be used in generating the output, which may include the identification of normal costs and/or outlier costs. Each of these models, in addition to potentially identifying business patterns, may also attempt to fit the collected data to at least one predefined business pattern.

The analytics engine 206 may also include a discovery engine 210 that is configured to determine a normal zone and discover outliers in the collected data. The discovery engine 210 may select the best fitting model from the fitting competition. The best fit may be determined using a function such as SSE, MSE, MAE, or the like.

The analytics engine 206 performs outlier detection, using the discovery engine 210 and the time series engine 208, based on data points collected by the data collection engine 204. Outlier detection is performed for historical data points and/or on the edge (present or latest) data points. Embodiments of the invention may be unsupervised. In order to perform outlier detection with a low number of false-positive alerts, a fitting competition may be performed between methods and models as previously stated.

Cost anomaly detection can be applied to various types of signals or time series data. Cloud cost, for example, can be represented as discrete units or in other manners. Cost anomaly detection, for example, can be applied to intra-day signals (e.g., hourly) or less frequent signals (e.g., weekly, monthly, quarterly).

In one example, a time-series may have a frequency of 1. This indicates that there is no seasonality and it may only be necessary to smooth the signal. Smoothing methods such as moving-average, or regression analysis (e.g., loess). In a case where the time series has a frequency of 7 (weekly seasonality), time-series models such as STL, Arima, ETS, Holt-Winters and more can be applied. This case can be repeated for a frequency of 30 (looking for a monthly signal, although the number of days in a month is not fixed) or a frequency of 24 for an hourly signal and so on.

Next, the problem of business environment patterns is considered. Embodiments of the invention allow for customization, in choosing a subset of desired patterns from existing ones, or the ability to add new patterns as needed. Business patterns can be as simple as workday/weekend, holiday, or a bit more complex such as first/ . . . /last weekend (or Friday/Saturday) of the month/quarter/year. Night hours in the weekend (for hourly data) or weekday and so on. These patterns can be captured using time-series methods that can handle exogenous variables, such as Arimax or other multivariate methods.

The best fitting model from the applied time series analysis (which may include the subset of the chosen business patterns) is selected. The best fit may be computed by means of accuracy using a function like SSE (sum of squared errors of prediction), MSE (mean squared error), MAE (mean absolute error) or the like. To find the outliers and identify the normal zone for the selected data points, the residuals of the best fitting model from the actual signal are analyzed. Several techniques can be performed on the residuals population to establish which residuals represent an outlier, such as Gaussian model, box-plot and so on.

Figure 4:
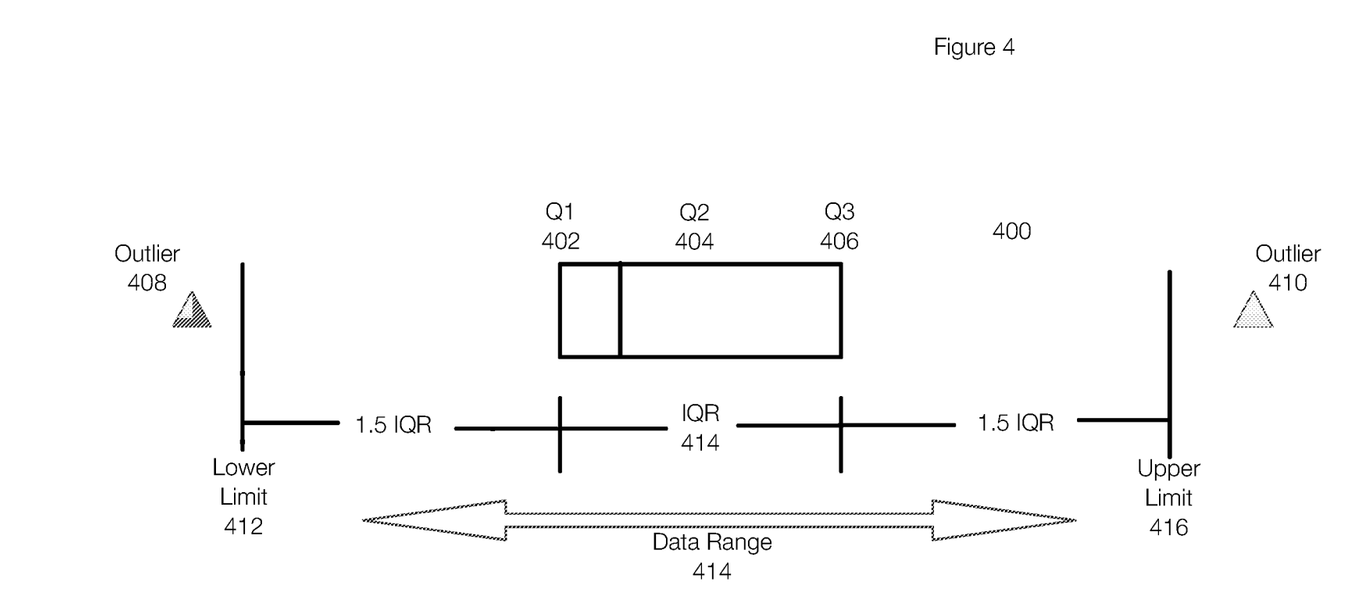
FIG. 4 illustrates an example of a tool used by the cost detection engine.

For example, FIG. 4 illustrates and example of a box plot. The box plot 400 illustrates a second quartile or median at Q2 404, a first quartile Q1 402 and a third quartile Q3 406. The rectangle between Q1 402 and Q3 406 is an example of an interquartile range or IQR 414. In this example, outliers 408 and 410 are more than 1.5 IQR below Q1 402 or more than 1.5 IQR above Q3 406. This 1.5 IQR defines, by way of example only, a lower limit 412 and an upper limit 416.

In other words, once the residual boundaries are established (e.g., the lower limit 412 and the upper limit 416), anomalous residuals can be declared or identified and thus represent outlier data points such as outlier data points 408 and 410.

Figure 5:
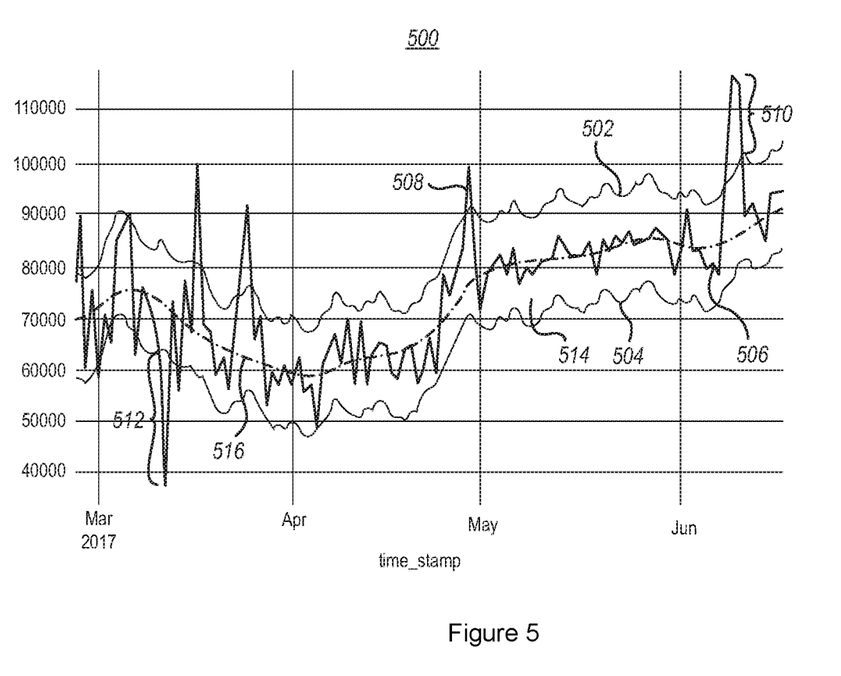
FIG. 5 illustrates the identification of cost anomalies in a computing system such as a disaster recovery system.

The normal zone can be established by adding the lower and upper limits 412 and 416 to a fitting model 500 (e.g., to the fitting model that was selected from the fitting competition), such as illustrated in FIG. 5. The sensitivity of the discovery mechanism can be adjusted. For example, the upper and lower limits may be set at different values. With regard to the IQR, for example, the limits of the normal zone can be controlled using the IQR coefficient or the definition of the upper and lower quartiles. This effectively causes the system to be more or less sensitivity. Often, the limits are controlled in order to account for the user time. A more sensitive system may identify more outliers and this may consume more user time.

FIG. 5 illustrates an example of time series with a normal zone and outliers and illustrates, by way of example only, a cost (y axis) versus time or time stamp (x axis). FIG. 5 illustrates a visual representation 500 that may be displayed in a user interface. The various data points used in the graph may be selectable and may allow a user to drill down to more specific time periods or to specific data points. FIG. 5 illustrates a normal zone that is defined by an upper bound 502 (e.g., the upper limit in FIG. 4) and a lower bound 504 (e.g., the lower limit in FIG. 4). The signal 506 (which corresponds to actual data or data points), when between the upper bound 502 and the lower bound 504, is considered to be normal. Thus, the cost is presumed to be normal at these values and times. FIG. 5 also illustrates portions of the signal (e.g., data points 508 and 510), which are above the upper bound 502 and are considered to be outliers. Similarly, the data points 512 are below the lower bound 504 and are considered to be outliers as well. The fit 516 of the selected model runs in the middle of the normal zone in one example. Thus, the residual is the difference between the data points and the fit 516.

Returning to FIG. 2, the analytics engine 206 may be configured to monitor the health of the cloud system by analyzing different costs of assets. This can be achieved by tracking time-series and analyzing the time series to discover outliers.

A tracking engine 212 may be configured to provide tracking, alerting, and investigating mechanisms. The user interface 214 may be configured to display aspects of cost anomaly detection visually to a user.

The cost detection engine 202 enables users and data protection administrators to obtain an accurate picture the health of their disaster recovery system and can expose anomalies and outliers that may require further investigation and actions.

In one example, a user is able to run the analytics engine 206 for any given period. The user can choose the sensitivity of the discovery engine 210 and decide if alerts for new outliers should be generated.

In one example, an outlier may be labeled as a non-outlier, because it repeats itself in some pattern-like fashion. The cost detection engine 202 can suggest a business pattern to be matched against the outlier. The benefit for the user is that the cost detection engine 202 will automatically treat the data point, which used to be an outlier, as normal in the future. The suggestions can come from a predefined set of business patterns or using an investigation mechanism. In one example, this mechanism may show the outliers on a calendar (for daily signal) or one on the top of the other for hourly signal (with the ability to add and remove days as needed, including focusing on weekdays/weekend and so on).

Embodiments of the invention may not use brute-force patterning (using all possible patterns) for several reasons. First, the time-series can be relatively short (like a daily signal of 1-3 months). For this kind of time series, the multivariate methods cannot be overloaded with too many variables. Second, when trying many potential patterns, the probability of wrongly matching a pattern increases.

The user interface 214 may be used to present a user such as an administrator with the anomalies in the selected or chosen time series. The discovery engine 210 is thus augmented with a visualization that illustrates the severity of the outlier by using an area called the normal-zone 514 which envelopes the area in which the signal is not an anomaly as shown in FIG. 5. The signal outside of the normal area 514 is considered as an outlier. The cost detection engine 202 also allows user to interact with the outlier to give the outlier labels or to obtain automated suggestions of business patterns that may change the classification of the outlier.

The cost detection engine 202 applies a competition in the context of anomaly detection. The competition is conducted between state-of-the-art methods and time series models. The consideration of many different methods and models improves classification accuracy by reducing false positives. This is important because different time-series may be "captured" better by different models. The best model is used to deduce the normal expected behavior, and subsequently, the difference between that and the actual signal (the residuals) is what exposes the anomalies. Therefore, the better the model, less wrong anomaly classifications are discovered.

In addition, customizable business behavior patterns are incorporated into the competing models. The framework of the cost detection engine 202 allows customization (e.g., choosing a subset of desired patterns from existing patterns, or the ability to add new patterns as needed). Business patterns can be as simple as workday/weekend, holiday, or a bit more complex such as first/ . . . /last weekend (or Friday/Saturday) of the month/quarter/year. Night hours in the weekend (for hourly data) or weekday and so on. Once identified, the best fit business pattern will be revealed to the user so that they can validate the selection or suggest others.

The cost detection engine 202, in particular the tracking engine 212 and user interface 214 enables a business pattern suggestion and investigation tool. If the user wishes to label an outlier as a non-outlier, because the identified outlier repeats itself in some pattern-like fashion, the system can suggest a business pattern to be matched against the outlier. The benefit for the user is that the system will automatically treat what used to be outlier as normal in the future.

Figure 3:
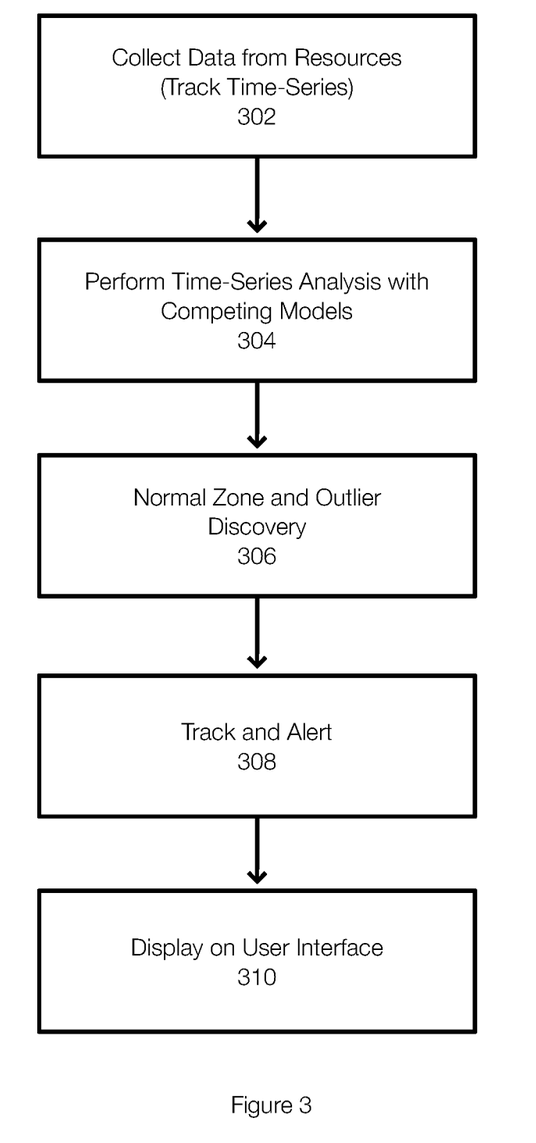
FIG. 3 illustrates an example of a method for detecting cost anomalies.

FIG. 3 illustrates an example of a method for performing cost anomaly detection. Initially, data is collected from resources or assets of a data protection system including a disaster recovery solution. The data is collected 302 at least from each asset that incurs cost. Because each asset has a unique identifier, the cost of each asset can be tracked granularly. This data constitutes an example to time series data. As previously stated, time series can be generated for the system, for specific assets or portions of the system.

The data is typically collected on an ongoing basis. Thus, the time series usually stores older data and newly added data. In one example, the data may expire or be reduced in terms of scale. The collected data can be processed to generate multiple time series. Alternatively, data can be collected from individual assets, from the system, or the like and associated with different time series.

Next, a type series analysis is performed using competing models. These models may include or allow for customizable business patterns. The patterns may be detected automatically by the models over time and may be based on frequency, and or other variables.

The model that results in the best fit, including by accounting for a set of selected business patterns, is chosen. Once the model is selected and analyzed, the residuals of the best fitting model can be used to identify a normal-zone and to discover outliers 306. The model or fit can be processed using a Gaussian analysis, a box plot, or the like to identify the limits of the normal zone. The limits can then be applied to the results of the model to identify outliers.

The cost detection engine may also perform 308 tracking, alerting, and/or investigating (e.g., to identify potential business patterns). The cost detection engine allows a user to change a data point from an outlier to a non-outlier. The results may be displayed 310 on a user interface.

Thus, the analytics engine 206 (or more generally the cost detection engine 202) may be configured to monitor the health of the cloud system by analyzing different costs of assets. This can be achieved by tracking time-series and analyzing the time series to discover outliers. The cost detection engine 202 enables users and data protection administrators to obtain an accurate picture the health of their disaster recovery system and can expose anomalies and outliers that may require further investigation and actions.

For example, an organization may define or determine that a disaster recovery test should be performed each quarter. If the disaster recovery test is not performed, the failure to perform this test is reflected in the cost and would be detected as an anomaly. This allows the system to identify whether the appropriate testing is being performed and to ensure that the system is operating as intended by monitoring the cost.

In another example, an organization may suffer from networking issues. Thus, the data path to the cloud may suffer from latency and errors. This would be reflected in the number of copies on the cloud and the recovery point objective (RPO). This could be brought to the attention of the organization by analyzing the cost because the storage cost would reduce. In other words, the system may send less data to the cloud and this would be reflected in the analysis of the cost.

In another example, the upload of a significant amount of data may occur near the end of each month. From perspectives including a daily perspective, this may be viewed as an outlier. The system, however, may identify this as a business pattern due to the monthly nature and the size of the data. Because this event may follow a pattern, data points may not be incorrectly identified as outliers. A user could also identify these points as normal or expected such the system would subsequently treat these points as normal.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data management operations. Such data management operations may include, but are not limited to, data read/write/delete operations, data backup operations, data restore operations, data cloning operations, data archiving operations, and disaster recovery operations. Thus, while the discussion herein may, in some respects, be directed to a discussion of data protection environments and operations, the scope of the invention is not so limited. More generally then, the scope of the invention embraces any operating environment in which the disclosed concepts may be useful. By way of illustration, but not limitation, embodiments of the invention may be employed in connection with data backup and restore platforms such as the Dell-EMC NetWorker and Avamar and Data Domain platforms.

A data protection environment may take the form of a public or private cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices or entities disclosed herein may be protected by one or more data protection policies according to various embodiments of the invention. Yet other examples of devices that may be protected by way of a data protection policy according to embodiments of the invention include, but are not limited to, containers, Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, containers, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for detecting cost-anomalies in a disaster recovery system, the method comprising:
    collecting data from assets associated with the disaster recovery system, the data including time series data;
    performing a plurality of time series analysis on at least a time series included in the time series data using a plurality of models, wherein each of the plurality of models is configured to determine expected values of the time series;
    determining that a first model from the plurality of models provides a best fit to the time series;
    determining a normal zone for the time series based on residuals of the first model, wherein the residuals include differences between the expected values and actual values of the time series and wherein both an upper limit and a lower limit of the normal zone are adjustable to control a sensitivity;
    determining outliers associated with the time series by applying the normal zone to an output of the first model, wherein a number of the determined outliers is based on the sensitivity;
    determining a cause of the outliers in the disaster recovery system; and
    alerting a user to newly detected outliers.

2. The method of claim 1, wherein each asset is associated with a unique identifier.

3. The method of claim 2, wherein the collected data includes a plurality of time series, wherein a first time series is associated with the disaster recovery system, a second time series is associated with a particular asset, and a third time series is associated with a plurality of the assets.

4. The method of claim 1, wherein the plurality of time series analysis includes a regression operation.

5. The method of claim 1, further comprising determining that an outlier is incorrectly classified and changing the classification of the outlier.

6. The method of claim 1, further comprising performing the plurality of time series analysis such that at least a subset of business patterns are included in the analysis.

7. The method of claim 6, further comprising detecting a potential new business pattern.

8. The method of claim 1, further comprising displaying results in a calendar or in a graph.

9. A system configured to detect cost-anomalies in a disaster recovery system, the system comprising:
    storage, processors, and memory, wherein the storage processors and memory are configured to:
        collect data from assets associated with the disaster recovery system and stored in the storage, wherein the collected data is stored in the storage as a plurality of time series;
        perform a plurality of time series analysis on at least a time series included in the plurality of time series using a plurality of models on the collected data, wherein each of the plurality of models is configured to determine expected values of the time series;

determine that a first model from the plurality of models provides a best fit to the time series;

determine a normal zone for the time series based on residuals of the first model, wherein the normal zone includes an upper limit and a lower limit and wherein the residuals include differences between the expected values and actual values of the time series and wherein both an upper limit and a lower limit of the normal zone are adjustable to control a sensitivity;

determine outliers associated with the time series by applying the normal zone to an output of the first model, wherein the outliers are outside of the normal zone, wherein the outliers include the cost anomalies in the disaster recovery system and wherein a number of the determined outliers is based on the sensitivity;

determining a cause of the outliers in the disaster recovery system; and alerting a user to newly detected outliers.

10. The system of claim 9, wherein each asset is associated with a unique identifier.

11. The system of claim 10, wherein the plurality of time series includes at least one of a first time series s associated with the disaster recovery system, a second time series associated with a particular asset, and a third time series associated with a plurality of the assets.

12. The system of claim 9, wherein the plurality of time series analysis includes a regression operation.

13. The system of claim 9, wherein the system is configured to determine that an outlier is incorrectly classified and is configured to change a classification of the outlier.

14. The system of claim 9, wherein the plurality of time series analysis accounts for at least a subset of predefined business patterns.

15. The system of claim 14, further wherein the system is configured to detect a potential new business pattern.

16. The method of claim 1, wherein the cost anomalies are presented in a user interface that allows a user to interact with the cost anomalies and wherein the cost anomalies are associated with assets protected by the disaster recovery system identified by the outliers.

* * * * *